Patented Oct. 23, 1934

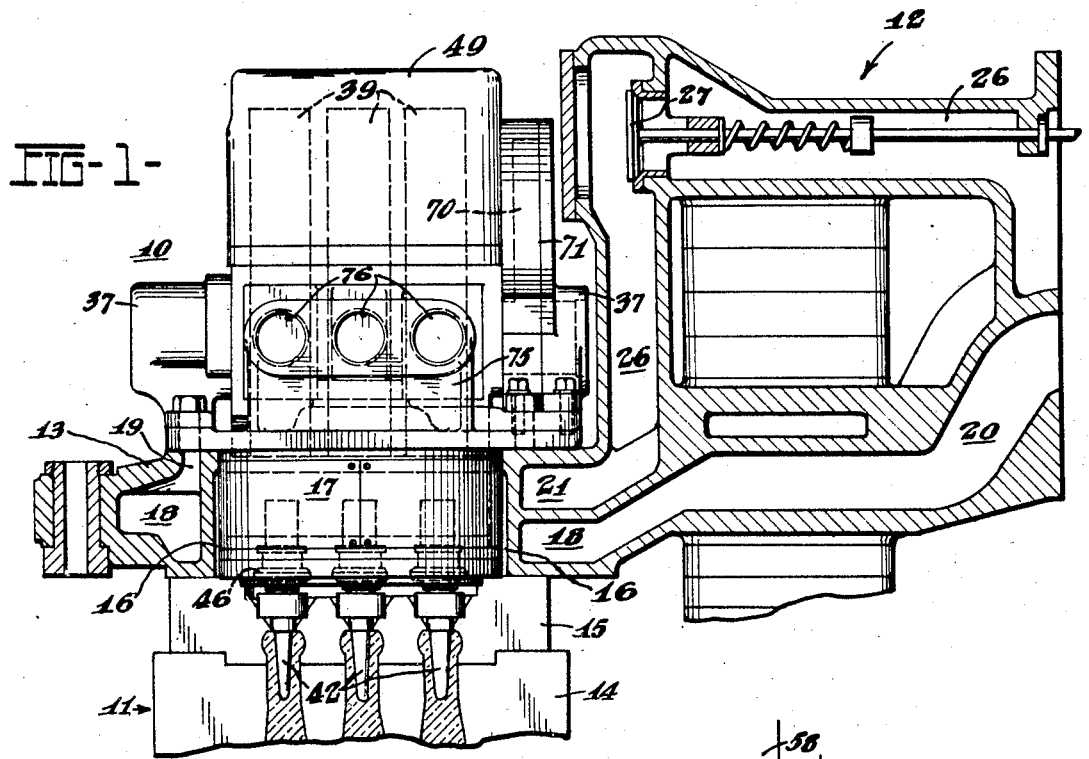
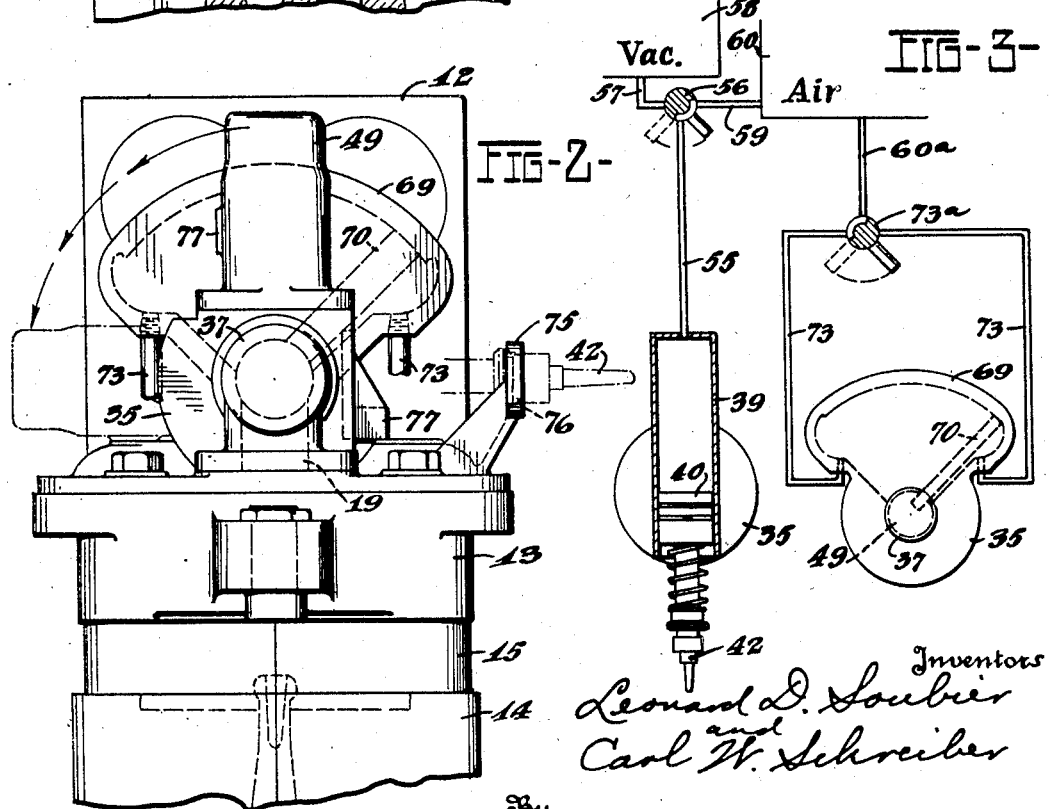

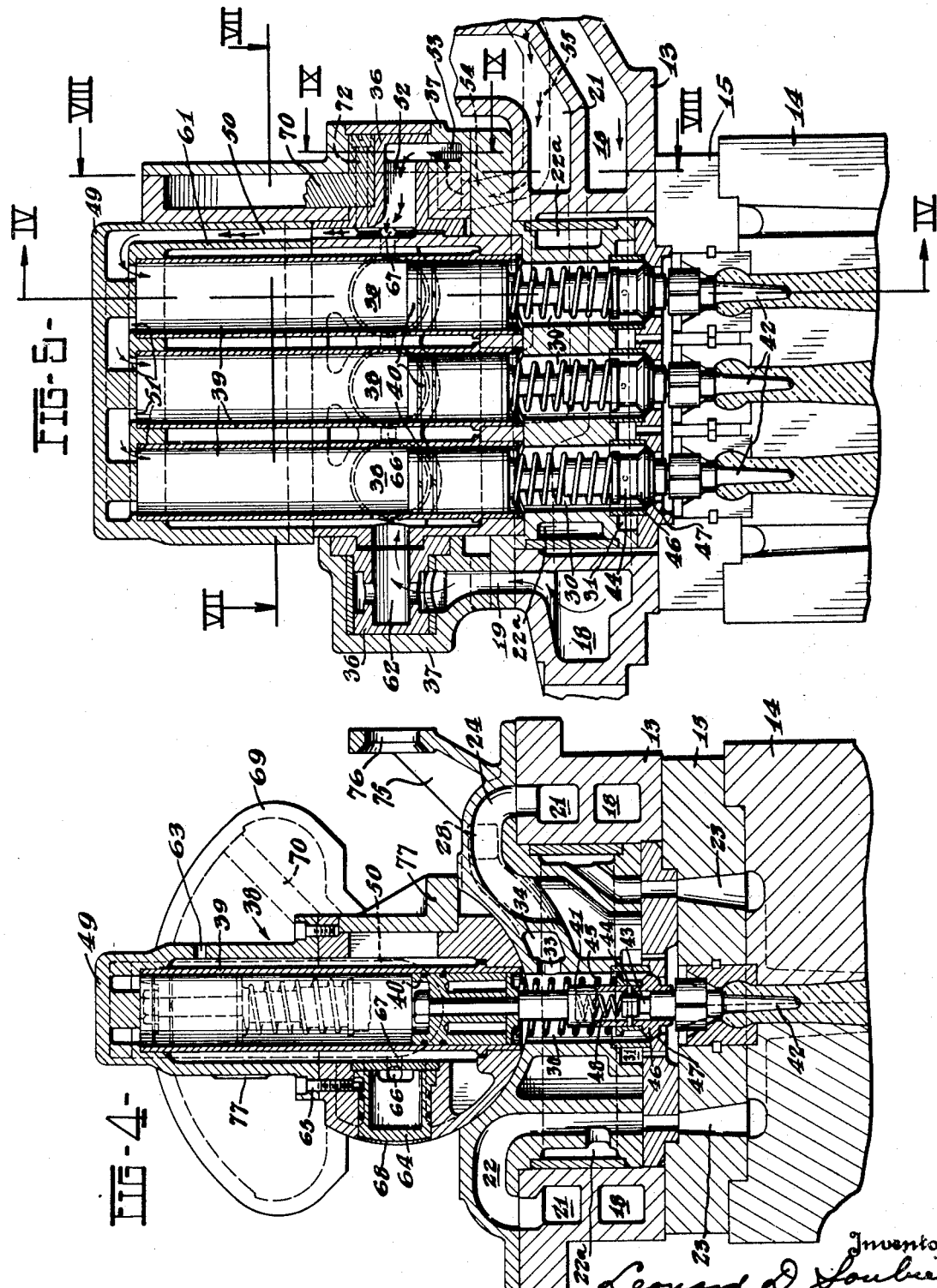

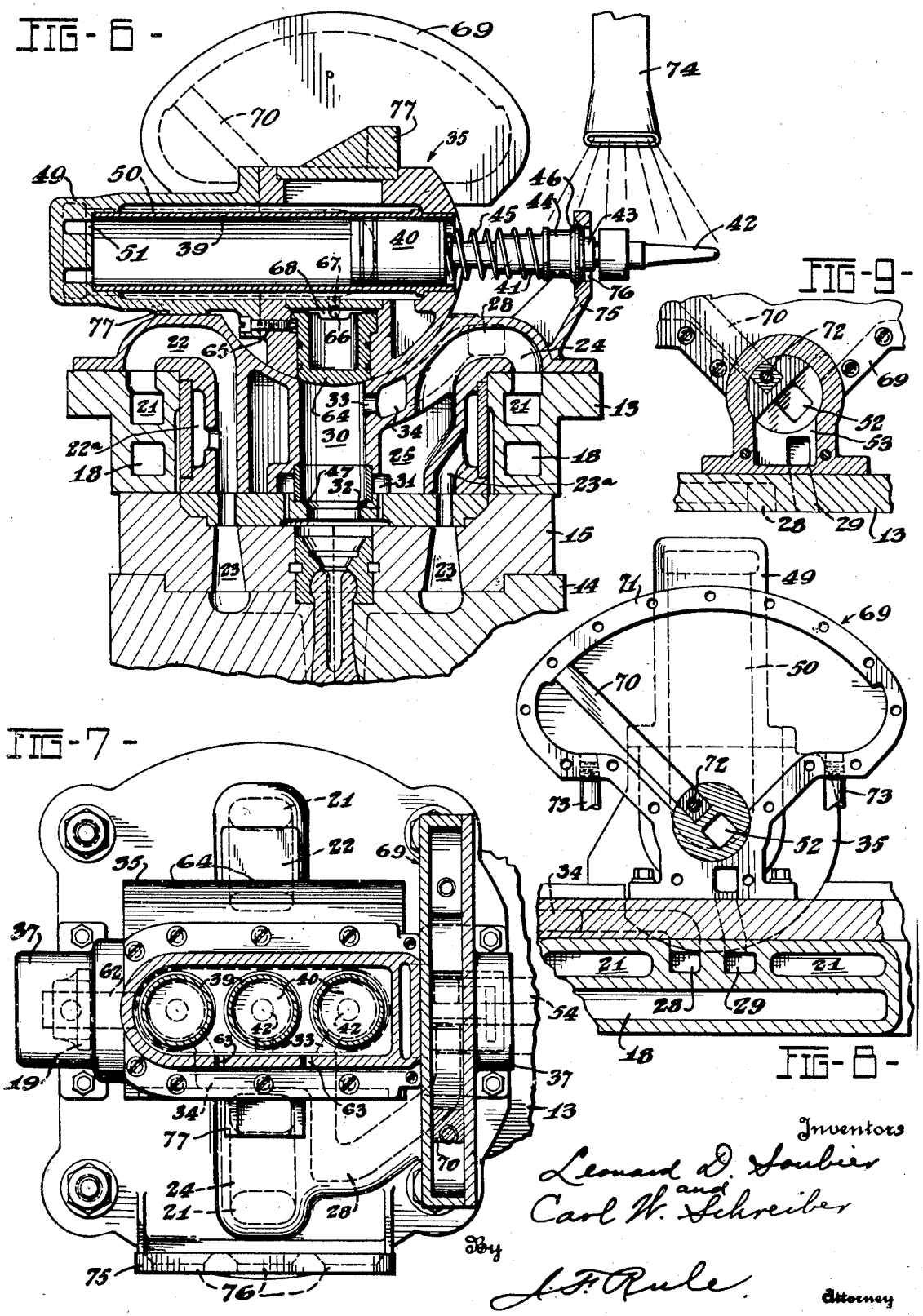

1,977,743

UNITED STATES PATENT OFFICE 1,977,743

GLASSWARE FORMING MACHINE

Leonard D. Soubier, Toledo, Ohio, and Carl W. Schreiber, Alton, Ill., assignors to Owens-Illinois Glass Company, a corporation of Ohio Application April 4, 1933, Serial No. 664,384

8 Claims. (Cl. 49—5)

The present invention relates to improvements in glassware forming machines and more particularly to apparatus for cooling the plungers commonly employed in connection with blank molds to shape the neck portion of bottles or the like articles and forming an initial blow opening.

In order to obtain satisfactory results in the operation of modern high speed bottle forming machines it is necessary to maintain the plungers below a predetermined temperature for the reason that molten glass readily adheres to overheated plungers and, therefore, withdrawal of the plungers from engagement with the blanks distorts the neck or finish portions thereof. Varied forms of devices for artificially cooling the plungers have been employed.

An object of the present invention is the provision of a novel form of apparatus for effectively cooling the plungers, such apparatus involving exposure of the plungers to the open air and in addition the direct application of cooling air thereto.

Another object is the provision of novel means for sealing the plungers openings in the combined suction and blowing head during the time plungers are retracted therefrom for cooling and while blowing air is being applied to the molds for expanding the blanks therein. To this end projection of the plungers at the cooling position is accompanied by operative positioning of the means for sealing the plunger openings, both operations being effected simultaneously and by air under pressure from the same source of supply.

Another object is the provision of novel means for oscillating the plunger carrier for the purpose of alternately placing the plungers in alignment with the blank mold cavities and in cooling position.

A further object is the provision in an apparatus of the above character of means facilitating removal and replacement of the plungers at the cooling position.

Other objects will be in part apparent and in part pointed out hereinafter.

In the drawings:

Fig. 1 is a fragmentary sectional elevational view showing one embodiment of the present invention.

Fig. 2 is a fragmentary front end elevational view thereof.

Fig. 3 is an air and vacuum pipe line diagram.

Fig. 4 is a sectional view taken substantially along the line IV—IV of Fig. 5.

Fig. 5 is a vertical longitudinal sectional view.

Fig. 6 is a view similar to Fig. 4 showing the plunger in cooling position.

Fig. 7 is a horizontal sectional view taken substantially along the line VII—VII of Fig. 5.

Fig. 8 is a sectional elevational view taken substantially along the line VIII—VIII of Fig. 5.

Fig. 9 is a detail sectional view taken substantially along the line IX—IX of Fig. 5.

Referring to Fig. 1 of the drawings, it will be observed that the plunger unit 10 constituting the present invention is shown in connection with a convetional form of plural cavity blank mold 11 and mold carrier 12 which carrier may well consist of a substantially L-shaped casting arranged at one end of a ram (not shown) or constituting part of a mold group of a rotary type bottle forming machine (not shown). The blank mold may be suspended from the horizontal table 13 of said lower carrier and as shown consists of partible body blank and neck molds 14 and 15 respectively.

The carrier 12 is provided with a plurality of conduits through which air and vacuum may be applied at proper intervals to the plunger unit and blank mold cavities. A vertical opening 16 extends through the horizontal table 13 in alignment with the blank mold to accommodate a plunger adapter 17 constituting part of the plunger unit 10. A chamber 18 encircles the vertical opening 16 and, therefore, the adapter 17 disposed in the latter for the purpose of conducting low pressure cooling air about said adapter. An outlet opening 19 at the forward end of this chamber permits flow of the cooling air upwardly to the plunger unit 10 as will be apparent presently. This cooling air enters the chamber 18 by way of a conduit 20 in the carrier, said conduit leading to any suitable source of supply of cooling air. A vacuum chamber 21 is provided in the horizontal table 13 just above the cooling air chamber 18 and at opposite sides of the longitudinal center line of the carrier. One of these chambers 21 (Fig. 6) communicates by way of a passageway 22 in the adapter 17 and a port 23 with the body blank mold cavity. A chamber 22ª communicating with the passageway 22 is connected through a conduit 23ª diametrically opposite said passageway 22 to the body blank mold cavity thereby facilitating quick exhaust of air from the mold. The other vacuum chamber 21 at the opposite side of the carrier communicates with the neck mold cavity by way of a passageway 24 and chamber 25 in said adapter. Both of these chambers are connected to a vacuum chamber 26 in the vertical portion of said carrier, said chamber 26 leading to any suitable source of vacuum. A valve 27 may be employed in regulating and controlling the application of vacuum to the blank mold. Air under high pressure for application to the mold charges or blanks and for the purpose of actuating the individual plunger carriers, is supplied to the proper points by way of conduits 28 and 29 provided in the casting just above the chambers 18 and 20 for cooling air.

The plunger unit 10 provides for periodic withdrawal and exposure of the plungers to the cooling influence of the outside air and acceleration of such cooling by directing a stream of cool air against the plungers through the medium of blowers or the like. Moreover, positioning of the plungers for cooling is such as to facilitate removal and replacement of the plungers or plunger tips as circumstances may require. The construction by means of which these ends may be attained is substantially as follows: The adapter 17 is provided with vertical passageways 30 individual to and coaxial with the mold cavities. About the lower end of each passageway 30 is an annular chamber 31 through which air is exhausted from ports 32 opening into the upper ends of the neck mold cavities. Air under pressure may be supplied to these passageways 30 through ports 33 which establish communication between said passageways and conduits 34 leading to the main supply conduit 28.

A plunger carrying drum 35 is rotatively mounted upon the upper side of the adapter 17, the opposite ends of the drum being provided with trunnions 36 journaled in bearings 37 carried by said adapter. The axis about which this drum oscillates intersects at right angles the longitudinal axes of said vertical passageways 30. A plurality of plunger operating motors 38 corresponding in number to that of the vertical passageways 30 are carried by the drum. Each motor includes a cylinder 39 extending transversely through the drum 35. A piston 40 is mounted for reciprocation in said cylinder and carries at its outer end a sleeve 41 to which a plunger 42 is separably connected. Separable connection between said plunger and sleeve is effected by the following construction. A stem 43 at the upper end of the plunger carries a removable cross pin, the opposite ends of which are adapted to extend into openings in the sleeve 41, said pin being held against accidental displacement by a collar 44. This collar is yieldingly held in operative position by a coil spring 45. A valve 46 is formed at the lower end of said sleeve 41 and normally rests upon a seat 47 during the mold charging operations. A coil spring 48 within the sleeve assists in removing the plunger when removal and replacement is necessary.

The plunger motors are operated by air and vacuum, air being employed in projecting the plungers and vacuum for the purpose of retracting them. The construction involved includes a jacket 49 or housing carried by said drum and enclosing those portions of the cylinders extending outwardly beyond the periphery of the drum 35. A conduit 50 at one end of the jacket or housing 49 leads to a plurality of ports 51 at the upper end of said motor cylinders 39. The opposite end of said conduit 50 is connected to an axial opening 52 in one of the trunnions 36 and thence by way of a chamber 53 and conduit 54 to the supply line 55. This supply line leads to a two-way valve 56 (Fig. 3) from which a pipe 57 extends to a vacuum tank 58 and a pipe 59 to an air supply tank 60. The two-way valve provides means whereby air under pressure and vacuum may be applied in alternation to the motors with the result that the pistons 40 are reciprocated in the proper fashion.

Provision is made for air cooling the cylinders 39 of the fluid motors, the construction involved including a housing 61 enclosing the side walls of said cylinders and a part of said housing being formed by one end wall of the outer jacket 49. Cooling air for circulation about cylinders within the housing 61 is supplied to said housing by way of the port 19 and an axial opening 62 in one of the trunnions 36. This cooling air is exhausted from the housing through an exhaust port 63.

When the plungers are in cooling or inoperative position (Fig. 6) it is desirable to seal the upper ends of the passageways 30 through which said plungers ordinarily project into the mold cavities. The present invention provides for this by building into the drum 35 sealing pistons 64 in the passageways for reciprocation along a path disposed at right angles to the path of travel of the plungers. Each sealing piston is limited in its reciprocation by a stop pin 65. A port 66 and conduit 67 provide communication between the cylinder 68 in which the sealing piston is mounted and the chamber 50 through which air and vacuum are applied in alternation to the motors 38. Thus the application of air under pressure to the motors while the plungers are in an inoperative position, acts simultaneously to move the sealing piston 64 into position for effectively closing the upper ends of the passageways 30.

Oscillation of the drum 35 is effected by a fluid motor 69 mounted upon one end of the carrier 12. This motor is of the fan type including a blade 70 mounted for oscillation about the axis of rotation of the drum 35 within a suitable housing 71. This blade 70 is secured to the housing 49 for the motors by means of a screw 72 or the like. Air under pressure is supplied to the opposite ends of the housing 71 in alternation by way of supply pipes 73 leading to a two-way valve 73ᵃ which in turn is connected to the air supply tank 60 through the pipe 60ᵃ.

In order to facilitate removal of the plungers and additionally to hold them in cooling position beneath the blower or blowers 74, a bracket 75 is provided at one side of the carrier 12 and formed with horizontal openings 76 individual to the plungers, said openings including seats upon which the valves 46 are held under pressure by the air being applied to the motors.

In operation, assuming that the plungers are positioned in the blank mold and mold charges of glass have just been gathered, the next step involves shutting off the vacuum to the mold cavities by any suitable means (not shown) and applying vacuum to the plunger motors for the purpose of moving the pistons 40 and therewith the plungers upwardly. Thus the plungers are retracted from the mold and adapter and so positioned that the drum 35 may be rotated 90° preliminary to placing the plungers in cooling position. Air under pressure is then applied to the oscillating motor 69 for the purpose of moving the drum through the angle just referred to, this operation being followed by the application of air under pressure to the plunger motors. Thus the plungers are projected through the openings 76 in said bracket 75. Simultaneously with this operation the sealing pistons 64 are moved into position to seal the upper ends of the vertical passageways 30 in the adapter 17. Following this operation a puff of air under pressure is applied through said passageway 30 to the upper ends of the partially formed blanks or parisons in the blank mold. Later, after the usual and well known glass fabricating operations, the plungers are again projected into the blank mold. This reverse operation of the plunger unit involves shutting off the flow of air under pressure to the plunger motors and application of vacuum thereto. This retracts the plungers and lifts the sealing pistons 64. The drum oscillating motor 69 is then operated to place the plungers in alignment with said passageways 30. Immediately thereafter air is applied to the plunger motors so that the plungers are again projected into the blank mold cavities. The swinging movement of the drum 35 is limited by a stop 77 carried by the drum and housing 49 engaging the upper side of the adapter 17. Removal of plungers while in the cooling position involves sliding the collar 44 along the sleeve 41 toward the corresponding piston and displacement of the cross pin so that the spring 48 expands and moves the plunger outwardly.

Modifications may be resorted to within the spirit and scope of the appended claims.

What we claim is:

1. In combination, a combined suction and blowing head having a vertical opening therethrough, a blank mold suspended from said head in register with the opening, a plunger adapter disposed in the opening and having a vertical passageway in alignment with the mold cavity, a plunger unit including a drum mounted upon the head for oscillation about a horizontal axis intersecting the axis of said mold cavity, a plunger operating motor carried by the drum, a plunger separably connected thereto, means for oscillating the drum to thereby alternately place the plunger in alignment with the mold cavity and in cooling position, means for operating the motor to thereby alternately project and retract the plunger, and means operable by axial projection of the plunger to the cooling position for sealing the upper end of said passageway.

2. In combination, a combined suction and blowing head having a vertical opening therethrough, a blank mold suspended from said head in register with the opening, a plunger adapter disposed in the opening and having a vertical passageway in alignment with the mold cavity, a plunger unit including a drum mounted upon the head for oscillation about a horizontal axis intersecting the axis of said mold cavity, a plunger operating motor carried by the drum, a plunger separably connected thereto, means for oscillating the drum to thereby alternately place the plunger in alignment with the mold cavity and in cooling position, means for operating the motor to thereby alternately project and retract the plunger, and means operable by projection of the plunger to the cooling position for sealing the upper end of said passageway, said passageway sealing means including a reciprocating piston mounted in said drum.

3. In combination, a combined suction and blowing head having a vertical opening therethrough, a plunger adapter arranged in the opening and having a vertical passageway therethrough, a blank mold suspended from said head in register with said passageway, a drum mounted upon the head for oscillation about a horizontal axis intersecting the longitudinal axis of the blank mold, a piston motor carried by the drum, a plunger operatively connected to said motor, a sealing piston carried by the drum, means for oscillating the drum to thereby alternately place the plunger in register with said passageway and in a cooling position, and means for applying vacuum and air under pressure to the motor and sealing piston causing operative positioning of said piston and projection of the plunger together.

4. In combination, a combined suction and blowing head, a blank mold suspended therefrom, a plunger unit including a drum mounted upon the head for oscillation about a horizontal axis intersecting the longitudinal axis of the blank mold, a plunger, a motor carried by the drum, a holder separably connecting the plunger and motor, means for operating the motor to thereby alternately project and retract the plunger, means for oscillating the drum, a housing enclosing at least a major portion of the motor and providing a cooling chamber about the latter, and means for causing circulation of cooling air through said chamber.

5. In combination, a combined suction and blowing head, a blank mold suspended therefrom, a plunger adapter, a drum mounted upon the adapter for oscillation about a horizontal axis, plungers carried by said drum, means for oscillating the drum including a blade mounted for oscillation about the axis of the drum and secured thereto, a housing for said blade, and means for applying air under pressure to opposite ends of the housing in alternation to move said blade.

6. In combination, a suction type blank mold, a plunger adapter provided with a vertical passageway therethrough in register with the longitudinal axis of the blank mold, a drum mounted upon said adapter for oscillation about a horizontal axis intersecting the axis of said vertical passageway, a piston motor carried by the drum and having its longitudinal axis intersecting at right angles the axis of rotation of said drum, a sealing piston mounted in the drum for reciprocation in a direction at right angles to the axis of the piston motor, a plunger operatively connected to said motor, means for oscillating the drum to thereby place the motor and sealing piston in register with the passageway in alternation, and means for alternately applying vacuum and air under pressure to the motor and sealing piston whereby the plunger is alternately projected and retracted and the sealing piston moved into and out of position to close the upper end of said passageway.

7. In combination, a suction type blank mold, a plunger adapter provided with a vertical passageway therethrough in register with the longitudinal axis of the blank mold, a drum mounted upon said adapter for oscillation about a horizontal axis intersecting the axis of said vertical passageway, a piston motor carried by the drum and having its longitudinal axis intersecting at right angles the axis of rotation of said drum, a sealing piston mounted in the drum for reciprocation in a direction at right angles to the axis of the piston motor, a plunger operatively connected to said motor, means for oscillating the drum to thereby place the motor and sealing piston in register with the passageway in alternation, means for alternately applying vacuum and air under pressure to the motor and sealing piston whereby the plunger is alternately projected and retracted and the sealing piston moved into and out of position to close the upper end of said passageway, a bracket carried by the adapter and provided with an opening through which the plunger is projected at a cooling position, and means forming a part of the plunger unit adapted for engagement with said bracket to limit the extent of projection of the plunger through said opening.

8. In combination, a suction type blank mold, a plunger adapter provided with a vertical passageway therethrough in register with the longitudinal axis of the blank mold, a drum mounted upon said adapter for oscillation about a horizontal axis intersecting the axis of said vertical passageway, a piston motor carried by the drum and having its longitudinal axis intersecting at right angles the axis of rotation of said drum, a sealing piston mounted in the drum for reciprocation in a direction at right angles to the axis of the piston motor, a plunger operatively connected to said motor, means for oscillating the drum to thereby place the motor and sealing piston in register with the passageway in alternation, means for alternately applying vacuum and air under pressure to the motor and sealing piston whereby the plunger is alternately projected and retracted and the sealing piston moved into and out of position to close the upper end of said passageway, a cooling jacket spaced from and enclosing a major portion of said motor, and means for circulating cooling air about said motor within the jacket.

LEONARD D. SOUBIER.
CARL W. SCHREIBER.